United States Patent Office 3,071,605
Patented Jan. 1, 1963

---

3,071,605
PROCESS FOR PRODUCING CYCLOPENTADI-
ENYL-TYPE METALLIC COMPOUNDS
Edward L. Morehouse, Snyder, N.Y., assignor to Union
Carbide Corporation, a corporation of New York
No Drawing. Filed Feb. 15, 1955, Ser. No. 488,433
20 Claims. (Cl. 260—429)

This invention relates to a process for the production of organo-metallic compounds. More particularly, it pertains to an improved process for preparation of organo-metallic compounds which contain a transition element as the metal component.

Several methods have previously been proposed for production of organo-metallic compounds of the type $R_2MX_2$ wherein R represents the residue of a cyclopentadienyl or substituted cyclopentadienyl compound, M is a transition element, X is halogen, and z may be zero, 1, 2 or 3. One of these methods, generally termed the Grignard method, involves reaction, for example, of a cyclopentadienyl Grignard reagent with a transition element halide in a suitable solvent. Another method generally relates to reaction of an alkali metal derivative of cyclopentadiene or substituted cyclopentadiene with a transition element halide.

It is the principal object of the present invention to provide an improved process for producing organo-metallic compounds containing a transition element as the metal component.

A particular object of the invention is the provision of an improved process for the production of bis(cyclopentadienyl) transition element compounds marked by economy of operation and good yields.

Other objects of the invention will in part be obvious and will in part appear hereinafter.

The present invention provides a process whereby cyclopentadiene or substituted cyclopentadiene having a methylene or substituted methylene group containing replaceable hydrogen, is reacted with a transition element halide in the presence of an organic amine with the resulting formation, as a product, of the desired organo-metallic compound. The organo-metallic compounds may be represented as having the general empirical formula: $R_2MX_z$ wherein R is a radical of an organic compound selected from the group consisting of cyclopentadiene, aliphatic and aryl substituted cyclopentadienes, M is a transition element, X is halogen and z is zero, 1, 2 or 3. The process of the present invention may be illustrated by the reaction of cyclopentadiene with ferrous chloride in the presence of diethylamine. The reaction takes the following course:

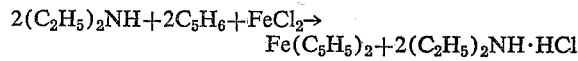

The bis(cyclopentadienyl)iron, which is the desired organo-metallic product in this particular instance, is easily separated from the diethylamine hydrochloride, which is insoluble in the reaction medium.

The reaction is applicable generally to transition element halides. If ferric chloride were substituted for ferrous chloride, the reaction would be modified to the extent of utilization of one mole of cyclopentadiene for reduction of iron from the trivalent to the divalent state. In that particular case the reaction may be depicted:

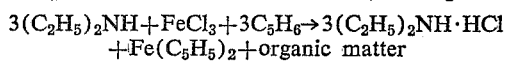

When the tetravalent transition element halides are employed, the reaction is basically the same except for the production of the halide of the bis(cyclopentadienyl) transition element compound. The preparation of bis(cyclopentadienyl)titanium dichloride is an example:

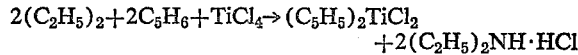

These reactions are generally applicable to the transition element halides. Reference herein to "transition elements" is to be understood to mean those elements of the periodic system characterized by having atoms in which an inner d level of electrons is present but not filled to capacity. In this group are: Sc., Ti., V., Cr., Mn., Fe., Co., Ni., Y., Zr., Nb., Mo., Tc., Ru., Rh., Pd., La., Hf., Ta., W., Re., Os., Ir., Pt., and Ac. as well as the so-called inner transition elements comprising the rare earth or lanthanide and the actinide series. The invention is especially adapted for the production of organo-metallic compounds of the type described in which the transition element is characterized by having an inner 3d orbital level which is partially occupied but is not filled to capacity. Consequently, this group of transition elements may be designated the 3d orbital series of transition elements. The process of the present invention is particularly applicable to operation with the halides of iron, nickel, zirconium, vanadium, cobalt and titanium to produce organo-metallic compounds of the character described which contain those elements.

The process of the present invention is applicable to reaction of cyclopentadiene and aliphatic substituted cyclopentadienes, particularly lower aliphatic substituted cyclopentadienes as, for example, methyl, ethyl, propyl, butyl and vinyl cyclopentadienes. Aryl substituted cyclopentadienes, as for example phenyl cyclopentadiene and 1,3-diphenylcyclopentadiene may also be employed. It is, however, necessary in all cases that there be one replaceable hydrogen on the methylene carbon atom of the cyclopentadienyl radical.

Amines which are applicable in the present invention include primary, secondary and tertiary amines wherein the log of the equilibrium constant for the reaction of the amine with a hydrogen ion, which constant is designated $K_A$, is at least 9.0. The value log $K_A$ may be expressed as:

$$\log K_A = \log \left[ \frac{[AH^+]}{[A][H^+]} \right]$$

wherein $K_A$ represents the equilibrium constant for the reaction:

$$A + H^+ \rightleftharpoons AH^+$$

in which A represents amine, $H^+$ represents a hydrogen ion, and $AH^+$ represents an ammonium ion. This constant may be designated the ammonium association constant.

It will be understood that in the process of the present invention the amine functions as a hydrogen halide acceptor, in effect, holding or sequestering the hydrogen halide formed by reaction of the cyclopentadiene with the transition element halide and thus enabling the reaction to progress satisfactorily. Therefore, the basicity of the amine is of importance.

As examples of amines which are satisfactory in the practice of the process of this invention, there may be mentioned: piperidine, diethylamine, ethylamine, n-butylamine, methylamine, i-butylamine, N-ethyl-ethylenediamine, N-methyl-ethylenediamine, benzylamine, triethylamine, ethylenediamine, and 1,6-hexanediamine.

In general, higher yields are obtained when using amines having higher log $K_A$ values, although other factors such as extent of solubility of the particular amine-transition element complex in the reaction medium may mask or counteract this tendency. Amines having log $K_A$ values of at least 10.8 are preferred for obtention of higher yields.

Amines of the types applicable in this invention show a strong tendency to form complexes with the transition element halide. In many cases reaction to form this complex is distinctly exothermic, considerable quantities of heat being produced. In general, it has been found that solubility of the amine-transition element complex in the reaction medium is desirable for preferred results.

The amine reactant may often satsifactorily be employed as the sole reaction medium. Liquid amines having log $K_A$ values of 9.0 or above and thus being suitable as reactants are often also suitable to serve as the medium in which the reaction is carried out, being good solvents for the reactants.

A preferred amine for use in the process is diethylamine. Its log $K_A$ value is relatively high (10.96) and it has a relatively low boiling point, a relatively low viscosity, and is generally a good solvent for anhydrous transition element halides, for complexes of such halides with this amine and for organo-metallic products.

The process of the present invention is preferably carried out by first mixing the amine with the transition element halide, whether or not in the presence of a solvent in addition to the amine, in order to permit formation of amine-transition element halide complex before addition of the cyclopentadiene or substituted cyclopentadiene. Thus if, as often is the case, the reaction taking place in formation of the complex is exothermic, the cyclopentadiene material will not have been subjected to heat and temperature conditions generated by the reaction, which otherwise would have induced considerable polymerization of the cyclopentadiene material, rendering it unavailable for the desired reaction.

The reaction of the present invention takes place over a fairly wide range of temperatures. For example, temperatures between about 10° C. and about 85° C. may be used. In general, temperatures of 20° C. to 40° C. are preferred since at these temperatures the reaction is sufficiently rapid and the yields are satisfactorily high. At lower temperatures, the reaction rate is less and at higher temperatures the ultimate yield may be somewhat decreased. Similarly, the ratio of reactants may be varied over wide values. It is preferred that a mole ratio of cyclopentadiene material to metal halide of at least 2:1 be employed. When amines having log $K_A$ values in the range 9.0–10.2 are employed, some augmentation of yield may accrue from using an excess of cyclopentadiene material. Mole ratios of cyclopentadiene material to metal halide of 8:1 or more may be employed. With large excesses of cyclopentadiene materials increased loss of such materials through polymerization may be expected. The mole ratio of amine to transition metal halide may also be varied over wide values, but it is preferably maintained between 10–16:1, which corresponds to about 0.6–1.0 mole of metal halide per liter of amine.

The time of reaction may be varied over wide limits and its value in any particular instance depends largely on the reaction temperature, the particular reactants and their ratio, and similar factors. In general, the reaction time employed in any particular instance can be determined by considering the yield and the rate of change of yield. Extended times for reaction have not been found deleterious. In general, reaction times of 1–8 hours have been found satisfactory although lesser reaction times may often be employed.

Other solvents may be employed along with the amine as part of the reaction medium without departing from this invention. Thus, alkylene and polyalkylene glycol dialkyl ethers, aromatic solvents as, for example, benzene and various alkyl ethers and other solvents, may be added without interfering with the process of this invention and sometimes also to advantage. However, it is to be understood that the presence of such additional solvents is in nowise necessary, the amine itself furnishing a suitable reaction medium.

A distinct feature and advantage of the process of the present invention is the ease and economy with which the amine salts may be reconverted into the amine for re-use in the process. The amine hydrohalide salt which is formed during production of the organo-metallic compound may be reacted with powdered transition element metal or with the hydroxide or oxide of the transition element to convert the amine hydrohalide salt to the amine. Another product of this reaction is the halide of the transition element employed. Consequently, it is desirable to employ in the reconstitution of the amine the transition element which is incorporated in the organometallic compound, thus achieving a distinctive cyclic continuous process in which two of the input raw materials, the amine and the transition element halide, are reconstituted. The principle may be illustrated by an example wherein ferrous chloride is reacted with cyclopentadiene in the presence of diethylamine. The products of that reaction are bis(cyclopentadienyl)iron and diethylamine hydrochloride, the mole ratio of the latter to the former being 2:1. The solid diethylamine hydrochloride may be separated by filtration from the product and reacted under molten conditions with powdered iron according to the following reaction:

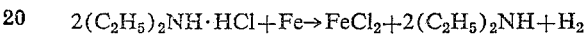

The molten amine hydrohalide in admixture with powdered metal is maintained at 180°–250° C. to allow reaction to take place. Under these conditions the amine vaporizes and may be separated from the hydrogen, which is also evolved, and recovered for re-use. It appears that some of the amine remains in the melt and the solid product obtained on cooling the melt, possibly because of formation of metal halideamine complexes.

Additionally, the amine may be recovered from its hydrohalide salt by reaction with an inorganic base which may be of an alkali or alkaline earth metal. Recovery in this manner may be illustrated by the following reaction of lime with diethylamine hydrochloride:

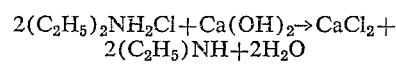

It will be seen that in any case the process presents a striking potential economy of materials. The process for producing organo-metallic compounds according to the present invention thus presents distinctive and unique possibilities of economical employment.

EXAMPLE I

*Preparation of Bis(Cyclopentadienyl)Iron From $FeCl_2$*

$FeCl_2$ was prepared by addition of 5 g. of Fe powder to 0.083 mole of $FeCl_3$ suspened in 175 ml. of anhydrous ethylene glycol dimethyl ether. The mixture was heated to reflux (about 86° C.), maintained at reflux for about 1 hr., then cooled to about 25° C. Then 175 ml. of anhydrous diethylamine were added with a resultant temperature rise to about 33° C. The reaction mixture was cooled to 25° C., then 0.25 mole of cyclopentadiene was added rapidly. No heat effect was noted. The mixture was stirred for about 2½ hr. at about 25° C., then for about 2½ hr. at about 65° C. The reaction mixture was cooled at about 25° C., filtered, and the cake washed with petroleum ether. The filter cake comprises primarily dimethylamine hydrochloride. The filtrate was vacuum stripped (about 25 mm. Hg) and the brown crystalline residue was recrystallized from petroleum ether to yield 12.8 g. of $Fe(C_5H_5)_2$.

EXAMPLE II

*Preparation of Bis(Cyclopentadienyl)Iron From $FeCl_3$*

0.1 mole of $FeCl_3$ was added to 170 ml. of diethylamine. At about 30° C. 0.3 mole of cyclopentadiene was added and the mixture stirred for about 6 hr. Then 600 ml. of petroleum ether were added, the mixture filtered and the filter cake washed with petroleum ether. The filtrate was vacuum stripped (about 20–25 mm. Hg) and the brown crystalline residue of $Fe(C_5H_5)_2$ recrystallized from petroleum ether to give 15.7 g. of product. The use of trivalent instead of divalent iron requires an extra equivalent weight of cyclopentadiene for reduction to the divalent state.

EXAMPLE III

*Preparation of Bis(Cyclopentadienyl)Iron From FeBr₂*

FeBr₂ was prepared by dropwise addition of 0.1 mole of Br₂ to 11.2 g. of Fe powder suspended in 150 ml. of ethylene glycol dimethyl ether at 20–30° C. The mixture was heated under reflux (about 85° C.) and maintained at reflux temperature for about 20 min. The light gray suspension was then cooled to about 20° C. Diethylamine (150 ml.) and 0.2 mole of cycylopentadiene were added. The suspension was stirred at room temperature for about 6 hr. and filtered. The filter cake was washed with petroleum ether and the filtrate vacuum stripped (about 20 mm. Hg). The resulting brown crystalline residue of Fe(C₅H₅)₂ was recrystallized from petroleum ether to yield 16.2 g. of product.

EXAMPLE IV

*Preparation of Bis(Methylcyclopentadienyl)Iron*

FeCl₂ (0.125 mole) suspended in 150 ml. of ethylene glycol dimethyl ether was mixed with 150 ml. of diethylamine and then 0.25 mole of methylcyclopentadiene was added. The mixture was stirred for about 8 hr. at about 25° C., then filtered. The filter cake was washed with benzene and the filtrate stripped (about 20 mm. Hg). Treatment of the brown liquid residue with dilute HCl produced a blue HCl layer. Amalgamated zinc was added to the blue solution and the reduction product extracted with benzene. The benzene solution was vacuum stripped and a red liquid obtained which crystallized upon cooling to about 25° C. to yield red crystals of Fe(C₅H₄CH₃)₂.

EXAMPLE V

*Preparation of Bis(Cyclopentadienyl)Nickel*

A mixture of 0.085 mole of nickel powder and 0.34 mole of diethylamine hydrochloride was heated to form a molten mass and maintained at 230–260° C. for 1½ hr. During the early part of the heating period, there was a steady evolution of gas and the melt became bright blue. The melt was then cooled to about 25° C. and the cake ground in a mortar. The resulting powder, comprising NiCl₂-diethylamine complex, was added to 200 ml. of diethylamine. Then 0.17 mole of cyclopentadiene was added, and the mixture heated to about 60° C. and maintained at reflux for about 3 hr. The mixture was cooled to about 25° C. and then filtered. The filter cake was washed with diethylamine and the filtrate vacuum stripped to a dark green crystalline residue which was then recrystallized from petroleum ether to give 7.5 g. of Ni(C₅H₅)₂.

EXAMPLE VI

*Preparation of Bis(Cyclopentadienyl)Zirconium Dichloride*

ZrCl₄ (0.1 mole) was added to 0.25 mole of cyclopentadiene in 175 ml. of diethylamine, and the reactants were stirred for about 5 hr. at about 25° C. Then 175 ml. of benzene was added and the mixture filtered. The filtrate was vacuum stripped to dryness, and the tan crystalline residue recrystallized from benzene to yield purified (C₅H₅)₂ZrCl₂. The filter cake was leached with benzene and additional product (C₅H₅)₂ZrCl₂, bis(cyclopentadienyl) zirconium dichloride, was recrystallized from the benzene wash. The total weight of (C₅H₅)₂ZrCl₂ thus recovered was 11.0 g.

EXAMPLE VII

*Preparation of Cyclopentadienyl Titanium Compounds*

TiCl₄ (0.125 mole) was added to 0.25 mole of cyclopentadiene in 175 ml. of diethylamine. The mixture was stirred about 2 hr. at about 25° C. and about 1½ hr. at about 67° C. Then the mixture was poured into dilute HCl and filtered. Both filter cake and filtrate were extracted with chloroform, then both chloroform layers were vacuum stripped to dryness and the residue recrystallized from benzene. The product consisted of red crystals of (C₅H₅)₂TiCl₂ and a smaller fraction of yellow crystals of C₅H₅TiOCl.

EXAMPLE VIII

*Preparation of Bis(Cyclopentadienyl)Cobalt*

CoBr₂ was prepared by addition of 0.1 mole of Br₂ to 0.2 mole of cobalt metal powder suspended in 150 ml. of ethylene glycol dimethyl ether. Following the addition of diethylamine (150 ml.), 0.2 mole cyclopentadiene was added. The mixture was stirred for about 4 hrs. at room temperature, then mixed into 400 ml. of petroleum ether, and the filtrate vacuum stripped to 12.5 g. of dark red crystalline residue, Co(C₅H₅)₂. The residue was refined by sublimation at 1–5 mm. Hg and 70–120° C. to yield a dark red crystalline sublimate.

EXAMPLE IX

*Recovery and Reaction of Diethylamine*

The petroleum ether-washed filter cake from a preparation carried out in the manner of Example I and containing 0.4 mole of (C₂H₅)₂NH·HCl was ground with 0.10 mole of Fe powder. The resulting mixture was heated and the powder gradually fused and became fluid. Some (C₂H₅)₂NH but principally H₂ was evolved. After an hour at about 240° C. the Fe powder had disappeared with formation of a clear brown liquid. Upon cooling, the melt became transformed into a brownish solid. Then 200 ml. of (C₂H₅)₂NH were added and the mixture heated and maintained at reflux for several minutes. The solid disintegrated and, upon cooling, brown crystals formed in the liquid. Then 0.132 mole of C₅H₆ was added rapidly. The mixture was stirred for 20 minutes at 25° C., and then was heated and maintained at reflux 40 minutes. After standing overnight, the reaction mixture was filtered and the filter cake washed with petroleum ether. The filtrate was stripped of solvent and Fe(C₅H₅)₂ recrystallized from petroleum ether. The yield of Fe(C₅H₅)₂ was 70% of theory.

While all of the above examples, save for Example IV, have illustrated aspects of the invention in terms of cyclopentadiene as the reactant furnishing the cyclopentadienyl residues, it will be understood that other cyclopentadienyl residues may similarly be employed in the general manners illustrated in the above examples. It is also to be understood that the cyclopentadiene employed should contain a cyclopentadienyl carbon ring structure:

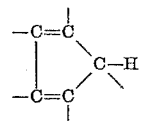

and that this ring structure must be alicyclic in character, i.e. both of its double bonds must not be coordinately shared with the double bonds of an aromatic ring as in fluorene which latter compound is not alicyclic in character and therefore does not contain an alicyclic cyclopentadienyl carbon ring. Thus, this invention is applicable to reaction of transition element halides with alicyclic cyclopentadiene monomers which include those monomeric hydrocarbons which contain an alicyclic cyclopentadienyl carbon ring structure which are here designated "alicyclic cyclopentadienes" or "an alicyclic cyclopentadiene." As indicated above, these include in addition to cyclopentadiene itself the hydrocarbon substituted cyclopentadienes as, for example, aliphatic substituted cyclopentadiene, including particularly the lower aliphatic substituted cyclopentadienes and aryl substituted cyclopentadienes in which the alicyclic character of the cyclopentadienyl carbon ring structure is retained. This preferred group of hydrocarbons may be defined as comprising cyclopentadiene and alicyclic hydrocarbyl-cyclopentadienes. A group which is particularly preferred for employment according to this invention consists of cyclopentadiene and lower alkyl substituted cyclopentadienes. While cyclopentadiene and alicyclic hydrocarbylcyclopentadienes are preferred for employment according to the process of this invention as the reactant furnishing the residue containing an alicyclic cyclopentadienyl ring structure, cyclopentadiene containing substituents other than hydrocarbon substituents may be employed provided the alicyclic character of the cyclopentadiene carbon ring structure is preserved.

As respects the halogen portion of the transition element halides which are applicable in this invention, any of the halogens may be used. In general, however, the halogens which are capable of existing in four or more valence states are preferred. These may be designated as quadrivalent halogens and comprise those halogens which have an atomic number of at least 17, namely, chlorine, bromine and iodine.

It will be noted that Examples I, III, IV and VIII above set forth, illustrate conducting the reaction in a liquid reaction medium containing in addition to the amine a substantial quantity of another organic liquid. In each of these examples, ethylene glycol dimethyl ether is illustratively employed as the additional organic liquid which may be present in the reaction medium. Also, in each of these examples the volume ratio of amine to such other organic liquid is 1:1. However, this value is merely conveniently illustrative and the ratio of amine to other organic liquid may be varied from 1:0, in which case the amine is the sole liquid reaction medium, to 1:10 or higher without departing from this invention or losing advantages accruing from its practice. As the volume ratio of additional organic liquid to amine increases, there will of course be noted a corresponding increase in the inert diluent effect since such other additional organic liquid functions essentially as an inert diluent. It is preferred that the amine comprise at least 10% by volume of the liquid reaction medium.

It is generally preferred that a readily stirrable reaction medium be provided in order that the reaction mixture may be suitably agitated. This may of course be accomplished by employing an excess of one or more of the reactants, including the amine or by adding a suitable volume of the additional organic liquid.

It will also be understood that the reaction is generally to be carried out under substantially anhydrous conditions. Presence of substantial quantities of water in the reaction medium is to be avoided.

Having described my invention, what I claim as new and desire to secure by Letters Patent is:

1. A process for the production of organo-metallic compounds which comprises reacting a transition element halide with a monomeric hydrocarbon compound containing a single alicyclic cyclopentadienyl ring, said ring having at least one replacement hydrogen atom on its methylene carbon atom, in the presence, as a hydrogen halide acceptor, of an acyclic hydrocarbon amine having a log $K_A$ value of at least 9.0.

2. A process for the production of organo-metallic compounds which comprises reacting a 3d orbital series transition element halide with a monomeric hydrocarbon compound containing a single alicyclic cyclopentadienyl ring, said ring having at least one replaceable hydrogen atom on its methylene carbon atoms, in a liquid reaction medium at least 10% by volume of said medium being, as a hydrogen halide acceptor, a liquid acyclic hydrocarbon amine having a log $K_A$ value of at least 9.0.

3. A process for the production of organo-metallic compounds which comprises reacting a transition element halide with a monomeric hydrocarbon compound containing a single alicyclic cyclopentadienyl ring, said ring having at least one replaceable hydrogen atom on its methylene carbon atom, in the presence, as a hydrogen halide acceptor, of an acyclic hydrocarbon amine having a log $K_A$ value of at least 10.8.

4. A process for the production of organo-metallic compounds having the empirical formula:

$$R_2MX_z$$

wherein R is a radical of an organic hydrocarbon compound containing an alicyclic cyclopentadienyl ring structure, said radical containing said ring structure less one replaceable hydrogen atom on the methylene carbon atom thereof, M is a transition element, X is halogen and z has one of the values 0, 1, 2 and 3, which comprises reacting a 3d orbital series transition element halide with a monomeric hydrocarbon compound containing a single alicyclic cyclopentadienyl ring, said ring having at least one replaceable hydrogen atom on its methylene carbon atom, in a liquid reaction medium at least 10% of said medium being, as a hydrogen halide acceptor, a liquid acyclic hydrocarbon amine having a log $K_A$ value of at least 9.0.

5. A process for production of organo-metallic compounds which comprises reacting a halide of a 3d orbital series transition element, the halogen component of said halide being selected from the group consisting of chlorine, bromine and iodine, with a monomeric hydrocarbon compound containing a single alicyclic cyclopentadienyl ring, said ring having at least one replaceable hydrogen atom on its methylene carbon atom, in a liquid reaction medium containing, as a hydrogen halide acceptor, a liquid acyclic hydrocarbon amine having a log $K_A$ value of at least 9.0, the mole ratio of said amine to said transition element halide being between about 10:1 and 16:1.

6. The process in accordance with claim 5 wherein said hydrocarbon compound is supplied to the reaction mixture in mole ratio to said transition element of at least 2:1.

7. A process for the production of organo-metallic compounds having the empirical formula:

$$R_2MX_z$$

wherein R is a radical of an organic hydrocarbon compound containing an alicyclic cyclopentadienyl ring structure, said radical containing said ring structure less one replaceable hydrogen atom on the methylene carbon atom thereof, M is a transition element, X is halogen and z has one of the values 0, 1, 2 and 3, which comprises reacting a monomeric hydrocarbon compound containing a single alicyclic cyclopentadienyl ring, said ring having at least one replaceable hydrogen atom on its methylene carbon atom with a transition element halide in a liquid reaction medium at least 10% by volume of which consist of a liquid acyclic hydrocarbon amine having a log $K_A$ value of at least 10.8, at a temperature between 20° and 40° C. said amine serving as a hydrogen halide acceptor.

8. A process for the production of organic-metallic compounds which comprises reacting a transition element halide with a monomeric hydrocarbon compound containing a single alicyclic cyclopentadienyl ring, said ring having at least one replaceable hydrogen atom on its methylene carbon atom, in a liquid reaction medium consisting essentially of a liquid acyclic hydrocarbon amine having a log $K_A$ value of at least 10.8, said amine serving as a hydrogen halide acceptor.

9. The process of claim 8 wherein the liquid organic amine is diethylamine.

10. The process of claim 8 wherein the liquid organic amine is ethylamine.

11. In a process for the production of organo-metallic compounds by reaction of a transition element halide with a monomeric hydrocarbon compound containing a single alicyclic cyclopentadienyl ring, said ring having at least one replaceable hydrogen atom on its methylene carbon atom, in the presence of a liquid acyclic hydrocarbon amine having a log $K_A$ value of at least 9.0, the steps which comprise admixing said transition element halide with said amine whereby a transition element halide-amine complex is formed and then admixing the resulting reaction mixture with said hydrocarbon compound.

12. In a process for the production of organo-metallic compounds by reaction of a transition element halide with a monomeric hydrocarbon compound containing a single alicyclic cyclopentadienyl ring, said ring having at least one replaceable hydrogen atom on its methylene carbon atom, in the presence, as a hydrogen halide acceptor, of a liquid acyclic hydrocarbon amine having a log $K_A$ value of at least 10.8, the steps which comprise admixing said transition element halide and said amine in the proportion of 0.6 to 1.0 mole of transition element halide per liter of amine, then admixing therewith said hydrocarbon compound and maintaining the resulting reaction mixture at a temperature of between 10° C. and 85° C.

13. A cyclic process for the production of an organo-metallic compound by reaction of a monomeric hydrocarbon compound containing a single alicyclic cyclopentadienyl ring, said ring having at least one replaceable hydrogen atom on its methylene carbon atom, with a transition element halide in the presence, as a hydrogen halide acceptor, of a liquid acyclic hydrocarbon amine having a log $K_A$ value of at least 9.0 in a reaction zone which comprises continuously carrying out the said reaction in a reaction zone; removing from said reaction zone a mixture of the said organo-metallic compound and amine hydrohalide; separating the said organo-metallic compound therefrom; admixing the same transition element metal in powdered form with the amine hydrohalide residue from said separation; reacting such mixture to produce transition element halide and to reconstitute the amine; introducing as the charge into the said reaction zone the transition element halide thus produced, said reconstituted amine, and said hydrocarbon compound, the latter being in at least the stoichiometric amount required for reaction with the transition element halide thus introduced.

14. A process for the production of organo-metallic compounds which comprises reacting a transition element halide with a compound selected from the class consisting of cyclopentadiene and mono-lower alkyl substituted cyclopentadienes, in a liquid phase, under anhydrous conditions and in the presence of an alkyl amine having a log $K_A$ value of at least 9.0.

15. The process of claim 14 where the transition element halide is a halide of a 3d orbital series transition element.

16. The process for the production of the dicyclopentadienide of a divalent transition metal which comprises reacting the dihalide of said metal with cyclopentadiene, in a liquid phase, under anhydrous conditions and in the presence of an amine selected from the group consisting of methylamine, ethylamine, diethylamine and triethylamine.

17. A process for the production of bis(cyclopentadienyl)iron which comprises reacting iron dichloride with cyclopentadiene, in a liquid phase, under anhydrous conditions and in the presence of diethylamine.

18. A process for the production of bis(cyclopentadienyl)nickel which comprises reacting nickel dichloride with cyclopentadiene, in a liquid phase, under anhydrous conditions and in the presence of diethylamine.

19. A process for the production of bis(cyclopentadienyl)cobalt which comprises reacting cobalt dibromide with cyclopentadiene, in a liquid phase, under anhydrous conditions and in the presence of diethylamine.

20. A process for the production of bis(cyclopentadienyl)titanium dichloride which comprises reacting titanium tetrachloride with cyclopentadiene, in a liquid phase, under anhydrous conditions and in the presence of diethylamine.

References Cited in the file of this patent

Birmingham et al.: Jour. Am. Chem. Soc. 76 4179 (1954), received May 6, 1954.

Miller et al.: Jour Am. Chem. Soc., p. 632, sec. 114 (1952), received July 11, 1951.

---

UNITED STATES PATENT OFFICE

CERTIFICATE OF CORRECTION

Patent No. 3,071,605            January 1, 1963

Edward L. Morehouse

It is hereby certified that error appears in the above numbered patent requiring correction and that the said Letters Patent should read as corrected below.

Column 7, line 59, for "replacement" read -- replaceable --; column 7, line 68, for "atoms" read -- atom --; column 8, line 51, for "consist" read -- consists --.

Signed and sealed this 8th day of October 1963.

(SEAL)
Attest:

ERNEST W. SWIDER
Attesting Officer

EDWIN L. REYNOLDS

UNITED STATES PATENT OFFICE
CERTIFICATE OF CORRECTION

Patent No. 3,071,605 January 1, 1963

Edward L. Morehouse

It is hereby certified that error appears in the above numbered patent requiring correction and that the said Letters Patent should read as corrected below.

Column 7, line 59, for "replacement" read -- replaceable --; column 7, line 68, for "atoms" read -- atom --; column 8, line 51, for "consist" read -- consists --.

Signed and sealed this 8th day of October 1963.

(SEAL)
Attest:

ERNEST W. SWIDER
Attesting Officer

EDWIN L. REYNOLDS

Acting Commissioner of Patents